Sept. 8, 1925.

J. H. FICHTEMAN

COMBINATION TACK PULLER AND SCISSORS

Filed March 12, 1924

1,552,688

Inventor
John H. Fichteman

By Hamell & Hamell
Attorneys

Patented Sept. 8, 1925.

1,552,688

UNITED STATES PATENT OFFICE.

JOHN H. FICHTEMAN, OF ST. LOUIS, MISSOURI.

COMBINATION TACK PULLER AND SCISSORS.

Application filed March 12, 1924. Serial No. 698,724.

*To all whom it may concern:*

Be it known that I, JOHN H. FICHTEMAN, a citizen of the United States, residing at St. Louis, in the State of Missouri, have invented certain new and useful Improvements in a Combination Tack Puller and Scissors, of which the following is a specification.

This invention relates to a new and improved combination tack-puller and scissors in the form of a tool or implement designed especially for use in shoe factories but which may also be used to advantage in other lines.

The principal object of the invention is to provide a tack-puller having a handle at one end and one of its longitudinal edges being sharpened to form a cutting edge in cooperation with a pivoted cutting blade also having a handle which may be gripped separately or together with the handle of the tack-puller. Various other objects and advantages of the invention will become apparent from the following description.

Figure 2:
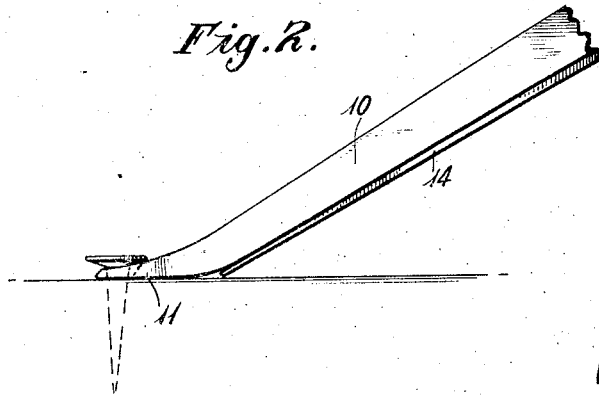
Fig. 2 is a view in side elevation.

In describing my invention in detail, 10 designates the body portion of the tack-puller which is provided at one end with a bifurcated tack-engaging claw 11 slightly curved when viewed in side elevation as in Fig. 2, and at its other end with a handle or operating portion 12. One longitudinal edge of body portion 10 is sharpened to provide a cutting edge indicated at 13 for the purpose that will presently appear.

Figure 1:
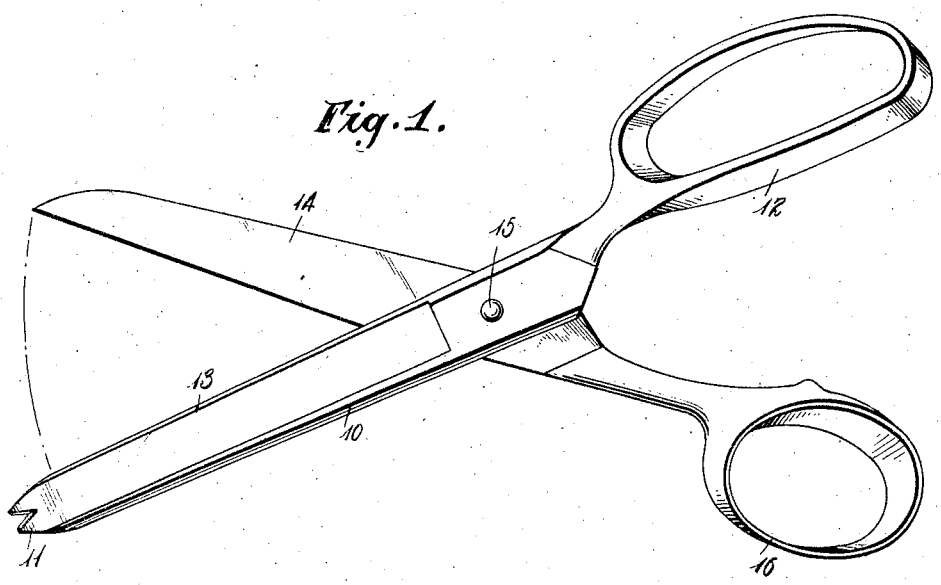
Figure 1 is a plan view of the invention in its preferred embodiment.
Figure 3:
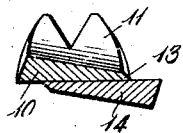
Fig. 3 is a detailed view.

Cutting blade 14 is pivotally mounted adjacent one end of body portion 10 as at 15 and is provided at its rear end with a handle or operating portion 16 that may be gripped and operated independently or together with handle 12. It will be observed upon reference to both Figs. 1 and 2 that cutting blade 14 is shorter than the body portion 10 of the tack-puller, so that when it is brought home in parallel relation to the body portion 10 it will terminate short of the tack-engaging claw 11. It will be thus noted that breakage or impairment of the tack-engaging claw 11 will not affect the efficient operation of the device or implement as a pair of scissors. Moreover, by providing the claw at the end of the blade, the wedge-shaped formation of the scissors blades, as shown in cross-section in Fig. 3, is taken advantage of for loosening the tack, since the blade 14 when moved under the claw-bearing blade 10 will tend to slightly lift the same. The invention is especially adapted for removing the small tacks out of a toe of a shoe after the same has been side lasted and it is required to cut out the box toe that holds the toe of the shoe up to its proper shape. It has heretofore been necessary for the workmen to first pull the tack out with a tack puller, replace the tack puller with the scissors which are used to push back the leather that comes over the toe, and then to cut the box toe at the proper point. This invention eliminates the additional work and time required by the handling of two separate tools and enables the workmen to perform these separate operations with a single tool and substantially in one movement.

What is claimed is:

A device of the character described comprising a pair of elongated members pivotally connected together intermediate their ends to provide relatively upper and lower blades having corresponding ends provided with operating handles, the said upper member having its opposite end flattened and notched and disposed angularly with respect to the member to provide a claw-foot inclined to the normal plane of the said member, and the said lower member being wedge-shape in cross-section for exerting a lifting force adjacent the claw-foot of the said upper member when moved thereunder and being shorter in length than the said upper member so that when moved under the same it will terminate short of the said claw-foot.

In testimony whereof I affix my signature.

JOHN H. FICHTEMAN.